INVENTOR.
PAUL R. BABCOCK
BY Joseph B. Gardner
his atty.

Patented Dec. 2, 1952

2,619,892

UNITED STATES PATENT OFFICE 2,619,892

FLOW DISTRIBUTION APPARATUS

Paul Roberts Babcock, Oakland, Calif.

Application May 3, 1947, Serial No. 745,891

4 Claims. (Cl. 98—40)

This invention relates to apparatus for modifying a flow of fluid issuing from a conduit or orifice so as to distribute said flow in a prescribed dispersal pattern in the space entered by the issuing fluid.

An object of the invention is to provide apparatus capable of distributing a concentrated flow of fluid, such as compressed air, entering a space, such as a room, in such a manner that a person stationed or moving about in said space will not be readily conscious of sustained or pulsating drafts which might otherwise be created by said flow.

Another object of the invention is to provide active apparatus, for dispersing a comparatively concentrated flow of fluid, which derives its power of motivation solely from the movement of the fluid constituting said flow.

A further object of the invention is to provide apparatus of the character described which is designed to permit unobtrusive combination thereof with an appurtenance of a room such as a ceiling lighting fixture.

Still another object of the invention is to provide apparatus of the type referred to which is constructed as an integral compact unit capable of being connected in an outlet orifice of a conduit or other structure forming a duct without in any way modifying the conduit or duct to provide said connection.

A still further object of the invention is to provide apparatus of the character described, in association with a duct through which a flow of fluid may pass, arranged in such a way that a minimized resistance to flow of the fluid is imposed by the apparatus.

The invention possesses other objects and features of advantage, some of which, with the foregoing, will be set forth in the following description of the preferred form of the invention which is illustrated in the drawings accompanying and forming a part of the specification. It is to be understood, however, that variations in the showing made by the said drawing and description may be adopted within the scope of the invention as set forth in the claims.

Referring to the drawing.

Figure 1:
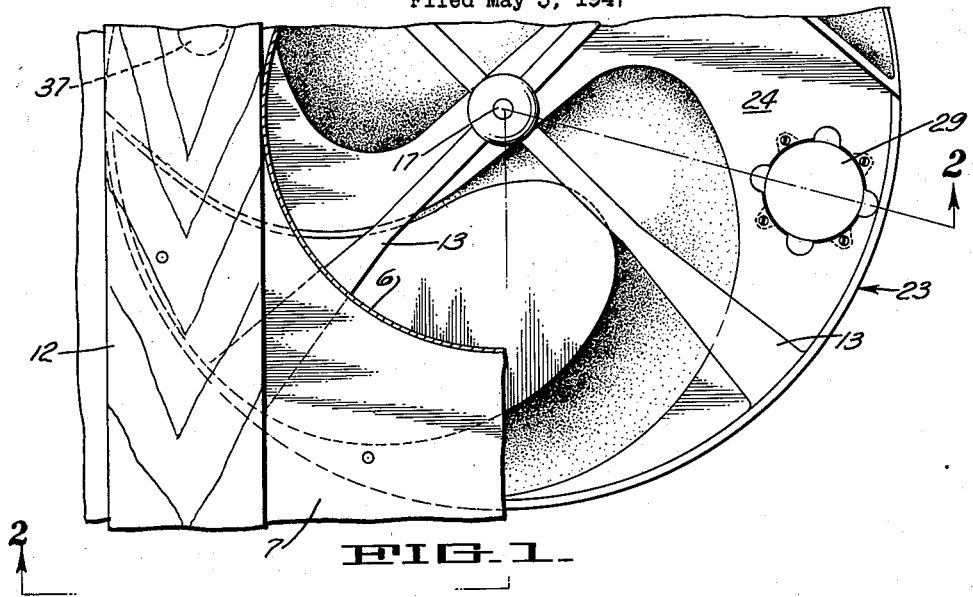
Figure 1 is a top plan view of the flow distribution apparatus of my invention.
Figure 2:
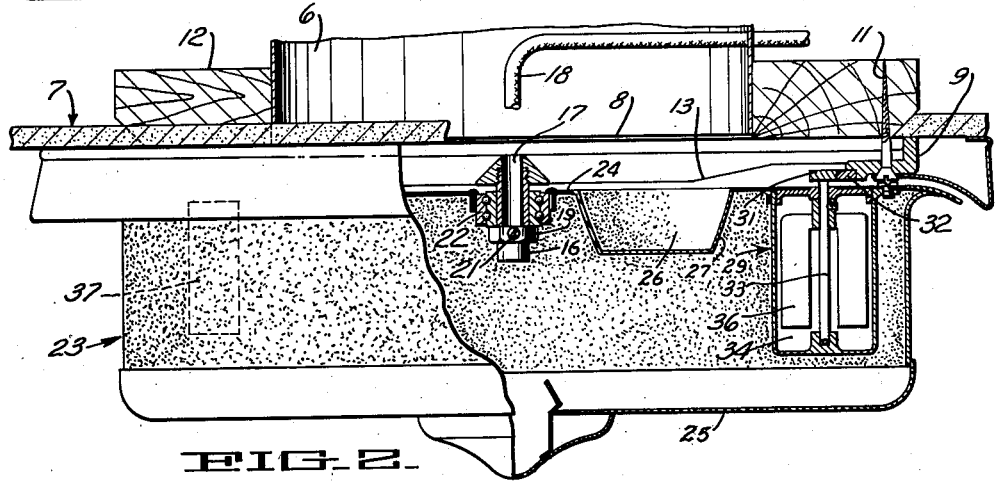
Figure 2 is a vertical sectional view of the apparatus taken in the plane indicated by the line 2—2 of Figure 1.
Figures 3, 4:
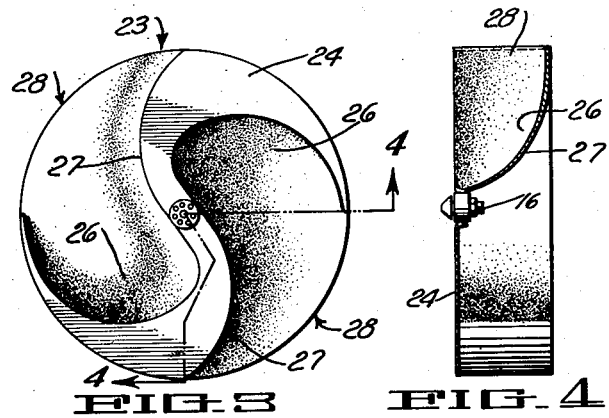
Figure 3 is a top plan view of the rotor.
Figure 4 is a vertical sectional view of the rotor taken in the plane indicated by the line 4—4 of Figure 3.

In the arrangement which I have selected for illustration of my invention and which is best depicted in Figure 2, I have shown an axially vertical conduit 6, here indicated as a heating or ventilation duct built into the ceiling structure 7 of a room or other space, and provided with a throat or orifice 8 which may open in planar adjacency to the exposed surface of the ceiling. Preferably overlying the orifice 8 and substantially concentric therewith I provide a mounting or base structure here shown as a ring 9 which may be secured by screws 11 or other suitable means to the wall frame structure 12 adjacent to or surrounding the conduit 6. The ring 9, in this instance, is preferably provided with a plurality of radially disposed arms 13 converging at or adjacent the center of the ring to connect with an axially-vertical shaft 16 preferably extending exteriorly of the conduit and downwardly beyond the exposed surface of the ceiling. As here shown, the shaft is made tubular in form or is otherwise provided with an axially-extending passage 17 through which an element such as an electric conductor 18 may be passed. Disposed in concentric relation with the shaft 16 and secured thereon by a nut 19 or other collar-shaped element, which is preferably locked in place by means of a setscrew 21 or the like, is a hanger bearing 22, preferably of the anti-friction ball type, whose outer annulus is attached to and forms an operative part of a rotor, generally indicated by the numeral 23 which is so formed and positioned as to intercept fluid issuing from the orifice 8 and to utilize the force of the flow for its rotational impetus. The rotor may be of light cast metal construction but is here shown as fabricated of sheet metal and comprises a cylindrically-shaped body having a substantially S-shaped top plate 24 comprising segments having a generally cycloidal form extending oppositely from the rotor axis and defining depressions 26 therebetween whose wall portions 27 sweep downwardly and radially outwardly to terminate in discharge openings 28 at the periphery of the rotor. The arrangement of the parts is such that air under pressure issuing from the orifice of the conduit 6 will impinge against the contoured walls of the depressions 26 and will be diverted radially outwardly of the rotor to discharge through the openings 28 in streams directed tangentially of the rotor against the comparatively stationary ambient air thus creating reactance torsional thrust in the rotor and causing the latter to rotate. Although the illustrated arrangement is such that the air streams leaving the conduit 6 impinge on the rotor and cause the latter to move, other means for moving the rotor may be used as desired, provided that a movement be given it such as will cause the direction of discharge flow to be continuously changed while the air is being forced through the conduit. A bottom plate 25 forms the lower portion of the rotor body as will be clear from Fig. 2 of the drawing.

It is important that the speed of the rotor be reduced to produce in the latter a barely perceptible movement. Such slow movement prevents the air streams issuing from the openings 28 from clashing with each other to create eddies and also prevents the resulting rapidly pulsating flow from becoming annoyingly perceptible to occupants of the space into which the streams may be discharged. If the streams were rapidly changed as to direction, there would also be created a series of whirlpools and swirling columns of fluid which would seriously impair the stream projection or, in other words, the radial distance that the streams would reach from the center of the distribution apparatus.

A governor 29 is provided here shown as a gear 31 carried by a governor shaft 33 and meshing with a pinion 32 fixed to the ring 9. This shaft is rotatable in an open topped cylinder 34 containing a liquid such as oil of a desired viscosity. On the shaft is a paddle 36, the rotation of which is resisted by the oil to the extent that the director rotates against the braking action such that its speed is considerably reduced below the speed which would be attained without the governor. The proportions and arrangements of the governor parts is such that the rotor, under the flow pressure of discharge from the conduit 6 will only complete rotation at the rate of about two or three revolutions per minute. In order to effect proper balance in the rotor to offset the load of the governor I provide a counterweight 37 secured to the rotor in a portion thereof diametrically opposed to the governor.

It is apparent from the above description that the flow distributor of this invention will deflect a plurality of air streams laterally beneath a ceiling toward the vertical walls of a room and slightly downward because of the shape of the depressions 26, said streams being directed in tangential directions from said apparatus and in slowly continuously-changing directions.

I claim:

1. In combination with a fluid conduit having an opening at one end thereof a flow distributor comprising a rotatable disk-like member arranged adjacent said outlet and operative by the fluid issuing therefrom and acting to deflect said fluid laterally of the outlet and continuously changing the direction of resultant flow of said fluid, mounting means for said member, hydraulic governing means operatively connected with said member and said mounting means to reduce the rate of movement of said member, and said member being disposed to extend transversely of and across said outlet and provided with a passage therein arranged to receive and direct the fluid as aforesaid.

2. In a fluid flow-distributor having a conduit and an outlet therefor, a rotatable member having spirally formed depressions extending across said outlet and arranged to laterally direct therefrom a stream of said fluid the direction of flow of which changes with rotation of said member, said depressions urging rotation of said member by the force of flow of said stream, means gravitationally supporting said member, and means for reducing the speed of rotation of said member appreciably below the normal rate of which said member would be revolved by said stream.

3. In a flow distributor having a conduit and an outlet for fluid under pressure, a rotatable member extending across said outlet and arranged to laterally direct therefrom a stream of said fluid the direction of flow of which changes with rotation of said member, mounting means for said member, said member including means for causing its rotation by the force of flow of said stream, and means independent of said mounting means for reducing the speed of rotation of said member appreciably below the normal rate at which said member would be revolved by said stream, said means for rotation including radially extending spirally formed depressions in the face of said member opposed to said outlet, with the outlet ends of the depressions located at the periphery of the member.

4. In a fluid flow distributor having a conduit and a conduit outlet located in a space enclosure and through which fluid under pressure may be discharged, a movable disk-like director member extending across said outlet and having therein a passage disposed to direct a stream of said fluid substantially tangential from said outlet close to and in a plane substantially parallel with a wall surface of said enclosure with the direction of said stream constantly changing in accordance with the movement of said member, and means including radially extending spirally formed depressions on said member for effecting movement thereof.

PAUL ROBERTS BABCOCK.

REFERENCES CITED

The following references are of record in the file of this patent:

UNITED STATES PATENTS

| Number | Name | Date |
|---|---|---|
| 611,480 | Hart | Sept. 27, 1898 |
| 1,990,801 | Spear | Feb. 12, 1935 |
| 2,000,112 | Wheeller | May 7, 1935 |
| 2,235,461 | Miller | Mar. 18, 1941 |

FOREIGN PATENTS

| Number | Country | Date |
|---|---|---|
| 263,953 | Great Britain | Jan. 10, 1927 |